United States Patent [19]

Karonis

[11] 3,870,425

[45] Mar. 11, 1975

[54] DRY SOIL PROCESS

[76] Inventor: George Peter Karonis, 1766 Hondo Rd., S. Port St. Lucie, Fla. 33452

[22] Filed: Feb. 11, 1974

[21] Appl. No.: 441,400

Related U.S. Application Data

[63] Continuation-in-part of Ser. No. 249,679, May 1, 1972, abandoned.

[52] U.S. Cl. ................................. 404/76, 106/287
[51] Int. Cl. ............................................. E01c 7/36
[58] Field of Search ............ 404/76, 75, 72; 106/95, 106/287 ES; 252/88; 61/36; 260/22

[56] References Cited
UNITED STATES PATENTS

| 1,029,643 | 6/1912 | Toch | 106/95 |
| 1,995,598 | 3/1935 | Archibald | 404/76 |
| 2,369,682 | 2/1945 | Miller | 404/76 |
| 2,679,491 | 5/1954 | Kennedy | 260/22 |
| 3,288,040 | 11/1966 | Burrows | 404/75 |

*Primary Examiner*—Nile C. Byers, Jr.
*Attorney, Agent, or Firm*—Jack N. McCarthy

[57] ABSTRACT

This invention discloses a chemical solution and involves the method of application of same, which when applied to soils will prevent them from becoming muddy, sloppy and icy. The process entails the analyses of the soil, i.e., gradation analyses, adsorption factors, determination of surface area of the soil particles, the proportions of the chemical solution, the rate of application and the method of treatment.

7 Claims, No Drawings

DRY SOIL PROCESS

This application is a continuation-in-part of application Ser. No. 249,679, filed May 1, 1972 and now abandoned.

SUMMARY OF THE INVENTION

The invention is composed of a standard and available chemical, namely sodium methyl silicate, which is diluted with water to a required calculated strength based on the analyses of the soil. Ammonia hydroxide can be added if neutralization is necessary. When the soil has been treated and allowed to dry, heavy rains, melting snow and freezing temperatures will have substantially no effect on the treated soil surface, as the water will run off towards the slop or grade of least resistance.

The treated soil will retain its original dry state, either loose or compacted, regardless of exposure to rain, snow or heavy freeze. Characteristics of the treated or processed soil change from a hydrophylic to a hydrophobic nature and the potency and life expectancy is indefinite. This process can eliminate undesirable and unsafe soil conditions wherever such conditions prevail.

This invention will revolutionize horse racing and other major athletic industries as it can provide ideal surface soil conditions at all times regardless of inclemate weather and at a feasible and economical cost. Many states, where tax revenue is realized through Thoroughbread or Harness race tracks and major athletic fields, have suffered heavy financial losses when compelled to cancel their respective sporting events due to unsafe and undesirable conditions of their soil surface.

This process, which has been field tested under stringent weather elements warrants recognition not only for use on horse race tracks and athletic field surfaces, but also for use in the construction industry.

DESCRIPTION PREFERRED EMBODIMENT

In preparing a soil for an application of the disclosed chemical solution, the following steps should be taken:
I. Analyses of Soil a. A 1 pound sample of loose soil is taken from the proposed area over every 500 square feet thereof, or whenever the characteristics of the soil appear to differ.

b. All samples are then thoroughly mixed to insure representation of the soil condition of the entire area to be treated.

c. A sample (for example, 2 to 5 pounds) is taken from the large sample (I$b$) and is sieved through No. 10 and No. 200 U.S. standard size sieves either by hand or by a mechanical sieve shaker.

d. The percent passing and the percent retained by each of the two sized sieves is mathematically computed on the total weight of the soil sample sieved giving the gradation analysis.

II Absorption Tests of Soil a. A small sample (500 gms.) is selected from sample (Step I$c$) and placed in a pan or vessel and allowed to dry to constant weight at an oven temperature of 100° to 110°C. Upon drying the sample is then placed in water and allowed to remain for 24 hours. The sample is then spread on a flat surface and exposed to warm air until drying has attained a saturated surface dry condition and is flowing freely.

b. The percentage of absorption is then calculated from the following formula:

Percent of Absorption = Percent $(500-A/A) \times 100$ where $A$ = weight in grams of oven dry sample in air.

III Solution Necessary for Coating

The percentage of solution necessary to coat the surface area of the soil particles of the sample I$c$ is calculated from the results obtained from Step I$d$ by multiplying the percent retained and the percent passing by the following numerical factors:

Empirical factor 0.045 × percent retained No. 10 size sieve

Empirical factor 0.065 × percent passing No. 10 size sieve and retained on No. 200 size sieve Empirical factor 0.220 × percent passing No. 200 size sieve The sum of the above formula expressed in percent, gives the percent of solution necessary to coat the sample set forth in I$c$.

IV Mixture of Solution a. The solution is composed of 1 part of sodium methyl silicate, and from 8.5 to 44 parts of water based on classification of soil, that is, (1) fine grain, (2) medium grain and (3) course grain. For fine grain the recommended proportion is 8.5 to 20 parts of water to 1 part of sodium methyl silicate, for medium grain the recommended proportion is 20 to 32, and for course grain the recommended proportion is 32 to 44 parts of water to 1 part sodium methyl silicate. For satisfactory results with a minimum of testing, 8.5 parts of water to 1 part of sodium methyl silicate can be used.

b. The sodium methyl silicate with an alkalinity of approximately twelve (12) can be neutralized with ammonia hydroxide with the water acting as the attenuating or diluting agent.

V Application a. The rate of application of the solution will vary from 0.25 gallons to 1.00 gallon per square yard for spraying on the surface of a semi-loose or compacted soil.

b. The rate of application of the solution will vary from 1.00 gallon to 3.00 gallons per square yard of surface area of loose or harrowed soil depending on the thickness of the soil to be treated and its related dry unit weight. If the total absorption of the soil exceeds 3 percent, the mixed solution is increased by 20 percent.

c. The mixture of solution is mixed in its proportions at a mixing plant and can be transported to the site of operations in drums or tankers.

VI Construction Procedures a. To take into consideration soil thickness, the entire soil surface is harrowed with standard harrowing equipment to a desired depth, for example, 6 inches, allowing the soil to dry by aireation.

b. When the soil has dried, a distributor truck equipped with a tachometer sprays the dried soil at a predetermined rate, until all the soil particles have been fully moistened or coated.

c. Upon coating the soil particles, the surface is harrowed until the processed soil retains its constant dry weight by aireation.

d. All surfaces are sloped to permit run-off of excess rainfall which flows into drainage ditches located outside the perimeter of the surface.

I claim:

1. A method for stabilizing soil including the steps of:
   a. forming a solution comprised of 1 part sodium methyl silicate and from 8½ parts to 44 parts of water,
   b. applying the solution to soil in a dry state at from 0.25 of a gallon to 3 gallons per square yard of soil.
2. A method as set forth in claim 1 including in step:
   b. applying the solution at from 1 to 3 gallons per square yard of soil,
   c. mixing the solution thoroughly with the soil at optimum moisture content,
   d. compacting the soil.
3. A method as set forth in claim 1 including in step:
   b. applying the solution at from 0.25 of a gallon to 1 gallon per square yard of soil by spraying on the dry surface of the soil.
4. A method as set forth in claim 1 wherein prior to step:
   b. the following steps are performed,
   c. harrowing the soil to a desired depth,
   d. aerating the soil until it is dry.
5. A method as set forth in claim 4 wherein step:
   c. the soil is harrowed in the range of from 1 to 6 inches.
6. A method as set forth in claim 4 including:
   e. grading and compacting the soil.
7. A method as set forth in claim 1 wherein step:
   a. the solution comprised 8½ parts of water.

* * * * *